D. P. MYERS.
Broom Head.
No. 53,323.
Patented March 20, 1866.
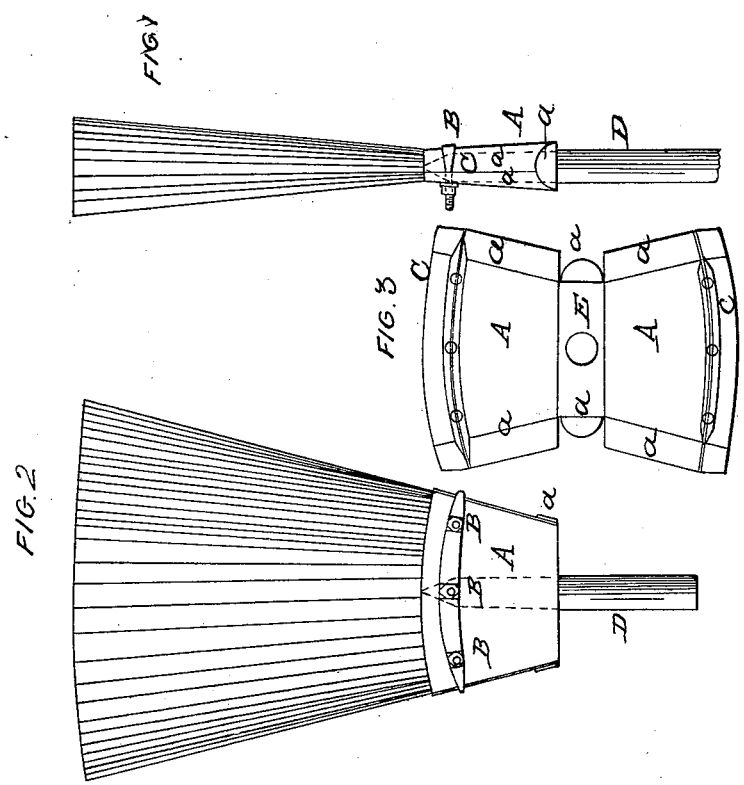

UNITED STATES PATENT OFFICE.

DAVID P. MYERS, OF SALEM, ILLINOIS.

IMPROVED BROOM-HEAD.

Specification forming part of Letters Patent No. 53,323, dated March 20, 1866.

*To all whom it may concern:*

Be it known that I, DAVID P. MYERS, of Salem, in the county of Marion and State of Illinois, have invented a new and Improved Broom-Head; and I do hereby declare that the following is a full, clear, and exact description thereof, which will enable others skilled in the art to make and use the same, reference being had to the accompanying drawings, forming part of this specification, in which—

Figure 1 is an edge view of my improved broom-head with brush and handle attached. Fig. 2 is a side view of the same. Fig. 3 is a plan view of my improved broom-head when cut out and before folding.

Similar letters of reference indicate like parts.

My invention has for its object the furnishing a broom head or clasp to which the brush and handle can be readily and quickly attached, and by which, when attached, they will be securely held together while the broom is being used; and it consists of a broom head or clasp made of sheet metal, cut out into the proper shape and then folded into the proper form, in combination with the bars and bolts by which and the brush and handle to which the said head or clasp is connected, as hereinafter more fully described.

A is the broom head or clasp, which is cut out into the form shown in Fig. 3. The clasp A is then folded into the form shown in Fig. 1, the end parts, a, overlapping each other and the part a' overlapping both, as shown. The side parts of the clasp A are grooved or corrugated, as shown in Fig. 3, so as to form a projecting ridge on the under or inner side of the said side parts, which, when the clasp is drawn together by the nuts and bolts B, grasp the corn and hold it firmly, preventing its being drawn out without first loosening the nuts on the bolts B. The sides of the clasp are strengthened and the parts of the clasp held more firmly together by the use of the straps or bars C, which overlie the corrugations on the side parts of the clasp, as shown in the drawings. The ends of one or both of these bars C are bent down over the edges of the broom, keeping the end parts, a, from giving or springing out under the pressure of the corn when the sides of the clasp are drawn together by the nuts and bolts B. The handle D of the broom passes through a hole, E, in the upper part of the clasp or head A and extends as far down as the lower edge of the clasp. It has a hole through its lower end, through which passes the central bolt, B. The broom is completed by opening up the sides of the clasp A and inserting the proper amount of broom-corn. The clasp is then pressed together, the bars C applied, the handle and the bolts put into their places, and the sides of the clasp drawn together by screwing up the nuts on the bolts B. This forces the corrugations of the sides of the clasp A into the corn, creasing it and preventing said corn from being drawn from the clasp.

Among the advantages of my invention may be mentioned that the clasp is so made that its sides are allowed to open wide, so as to admit the ready insertion of sufficient corn to form a firm and solid broom, and that the bars are so formed and applied and the bolts so distributed as to hold all parts of the broom equally firm, and at the same time prevent the edges of the broom from bulging or the overlapping ends of the clasp from springing or getting out of place.

Having thus described my invention, I claim as new and desire to secure by Letters Patent—

The combination of the corrugated clasp A and overlapping sides a, of the form herein shown, clasp-bars C, nuts and bolts B, and handle D, constructed and arranged in the manner and for the purpose herein specified.

The above specification of my invention signed by me this 13th day of November, 1865.

DAVID P. MYERS.

Witnesses:
J. H. PARK,
S. M. PARSONS.